US011898315B2

(12) United States Patent
Lamie et al.

(10) Patent No.: US 11,898,315 B2
(45) Date of Patent: Feb. 13, 2024

(54) ACTIVE ICE MANAGEMENT SYSTEMS AND METHODS

(71) Applicant: United States of America as Represented by The Secretary of The Army, Alexandria, VA (US)

(72) Inventors: Nathan J Lamie, Hanover, NH (US); Leonard Zabilansky, Hanover, NH (US); Christopher J Donnelly, Hanover, NH (US); Jordan M Hodge, Hanover, NH (US); William Burch, Hanover, NH (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 17/359,399

(22) Filed: Jun. 25, 2021

(65) Prior Publication Data

US 2022/0412032 A1  Dec. 29, 2022

(51) Int. Cl.
*E02B 15/02* (2006.01)
*E02B 15/04* (2006.01)
*C02F 1/40* (2023.01)
*E02B 15/06* (2006.01)
*E02B 15/10* (2006.01)
*C02F 103/00* (2006.01)
*C02F 101/32* (2006.01)

(52) U.S. Cl.
CPC .............. *E02B 15/048* (2013.01); *C02F 1/40* (2013.01); *E02B 15/02* (2013.01); *E02B 15/06* (2013.01); *E02B 15/10* (2013.01); *C02F 2101/32* (2013.01); *C02F 2103/007* (2013.01); *C02F 2201/002* (2013.01)

(58) Field of Classification Search
CPC ........ E02B 15/02; E02B 15/045; E02B 15/06; E02B 15/10; B65G 33/00; B65G 33/30; C02F 1/40
USPC ... 210/170.05, 170.09, 170.11, 242.3, 747.6, 210/776, 923; 405/60, 63; 198/657, 662, 198/676
See application file for complete search history.

(56) References Cited

U.S. PATENT DOCUMENTS

| | | | | |
|---|---|---|---|---|
| 376,552 | A * | 1/1888 | Russler | B65G 33/00 198/676 |
| 3,666,099 | A * | 5/1972 | Galicia | E02B 15/105 210/776 |
| 3,753,496 | A * | 8/1973 | Boyd | E02B 15/107 210/242.3 |

(Continued)

*Primary Examiner* — Christopher Upton
(74) *Attorney, Agent, or Firm* — Brian C. Jones

(57) ABSTRACT

In one embodiment, an ice management system is provided for removing an amount of oil from a surface of a body of water. The ice management system includes an ice frame having an ice fence coupled with an ice cage, an oil skimmer device disposed within the ice frame, and an ice deflection assembly coupled with the ice frame. The ice deflection assembly includes an auger coupled with a motor. The auger includes a drum and a deflection mechanism, and the motor is configured to rotate the auger. The deflection mechanism includes a spiral flight or a series of tabs arranged in a corkscrew pattern about the drum. The ice fence includes a plurality of curved vanes. The curved vanes have a bent rectangular plate shape.

8 Claims, 8 Drawing Sheets

(56) References Cited

U.S. PATENT DOCUMENTS

| | | | | |
|---|---|---|---|---|
| 4,039,454 | A * | 8/1977 | Miller | E02B 15/103 |
| | | | | 210/242.3 |
| 4,196,087 | A * | 4/1980 | Gordon | E02B 15/105 |
| | | | | 210/242.3 |
| 4,747,361 | A * | 5/1988 | Lundin | E02B 15/104 |
| | | | | 210/242.3 |
| 4,899,867 | A * | 2/1990 | Ryan | B65G 33/30 |
| | | | | 198/669 |
| 4,935,152 | A * | 6/1990 | Gonzales | E02B 15/06 |
| | | | | 210/747.6 |
| 4,976,855 | A * | 12/1990 | Virtanen | E02B 15/048 |
| | | | | 210/242.3 |
| 6,592,765 | B1 * | 7/2003 | Mykkanen | E02B 15/045 |
| | | | | 210/776 |
| 8,343,358 | B2 * | 1/2013 | Immonen | B63B 35/32 |
| | | | | 210/242.3 |
| 2016/0017561 | A1 * | 1/2016 | Lindholm | E02B 15/10 |
| | | | | 210/242.3 |
| 2016/0362862 | A1 * | 12/2016 | Hazel, III | E02B 15/02 |

* cited by examiner

ACTIVE ICE MANAGEMENT SYSTEMS AND METHODS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to protective frames for oil collection systems, and more particularly but not exclusively, active ice mitigation systems and methods that can be used to prevent broken ice from accumulating near an oil collection skimmer, where the accumulated ice could otherwise disrupt operation of the skimmer.

Description of the Related Art

This section introduces aspects that may help facilitate a better understanding of the invention. Accordingly, the statements of this section are to be read in this light and are not to be understood as admissions about what is prior art or what is not prior art.

Oil skimmers and other skimming and/or oil removal systems are used to recover various types of floating oils, greases, fats, particles, debris, and the like, which may be floating at or near a surface of a body of water or fluid, such as a pond, lake, sea, ocean, river and the like. Oil removal systems are typically used for oil spill remediation, as a part of oily water treatment systems, removing oil from machine tool coolant, removing oil from aqueous parts washers, and the like. In operation, a skimming media of the skimmer, such as a belt, tube, rope, mop, or disk, can contact the floating oil, and thereafter the oil can be directed to a container for storage.

When an oil skimmer is operating in the Arctic environment or other locations where broken ice may be present at or near the surface of the water, ice blockage of the skimmer may result during operation of the skimmer as water, oil, and ice are drawn toward the oil skimmer. In order to prevent ice accumulation near the oil skimmer, devices such as dam intakes, cooling water intakes, and protective frames have been proposed to keep the ice away from the skimmer, while at the same time allowing passage of water and oil to the skimmer recovery mechanism.

Existing ice exclusion techniques can be helpful in reducing the amount of ice which accumulates near oil skimmers. Yet still further improvements in ice exclusion technology are desired. Embodiments of the present invention provide solutions for at least some of these outstanding needs.

SUMMARY

The present invention was developed to address the challenges associated with existing ice exclusion devices. For example, ice mitigation systems as disclosed herein are well suited for use with any of a variety of oil skimmer techniques that may be employed in cold operating environments. Exemplary ice mitigation systems can operate to protect against ice accretion near the skimmer, and still allow oil to be drawn to the center of a protective frame either by operation of the skimmer action or by a separate current inducing system.

Although many of the embodiments disclosed herein are well suited for use in oil recovery methods, it is understood that ice management systems, and more broadly, object management systems, can be used to manage any of a variety of materials in addition to or instead of oil, such as protein, floating trash, debris, and other items. The object management systems can be used in conjunction with oil skimmer devices and/or any other desired type of recovery devices, such as sump pumps or protein skimmers.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
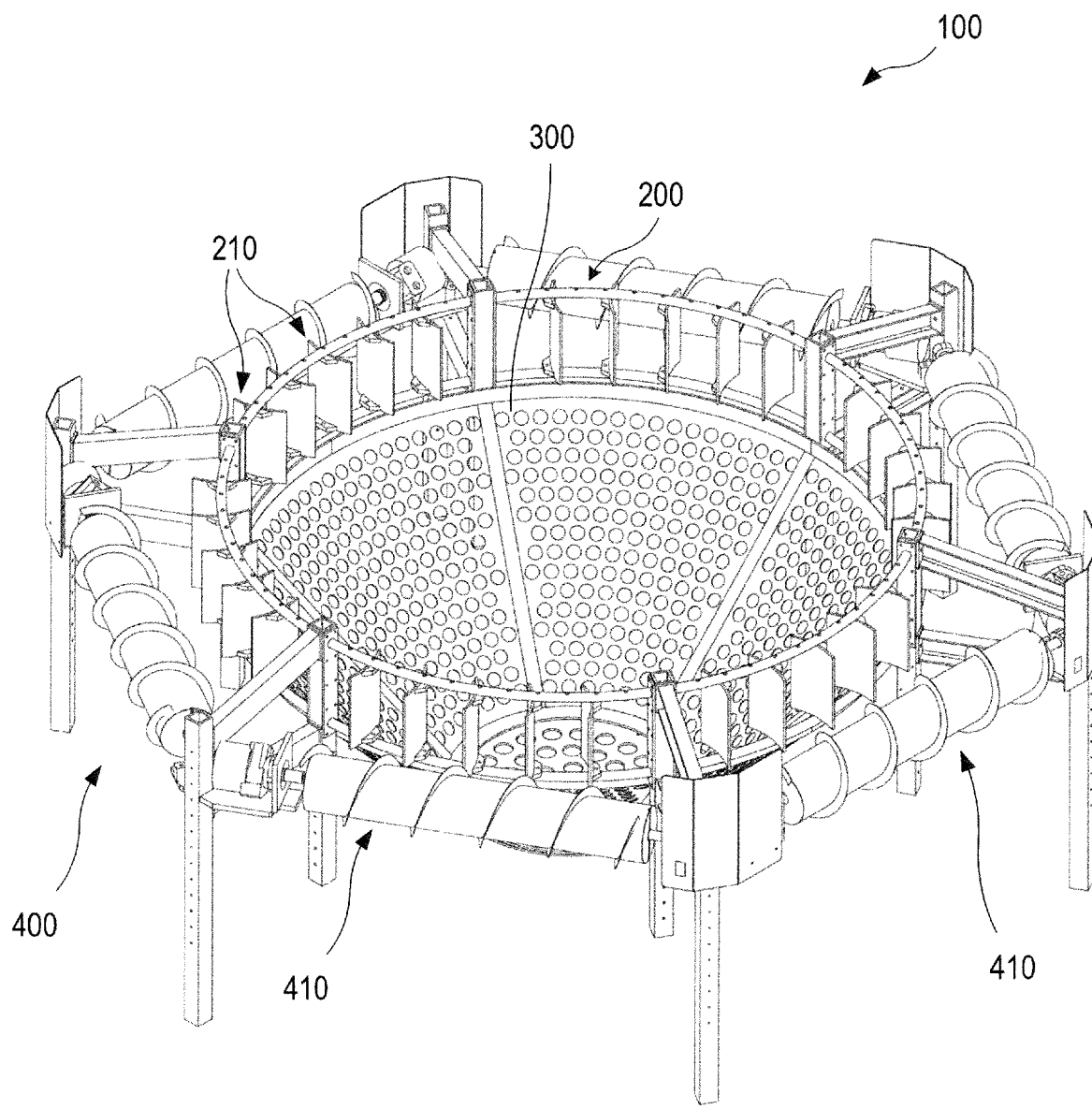
FIG. 1 depicts a perspective view of an ice management system according to certain embodiments of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In at least one embodiment, the present invention aims to address the shortcoming of existing ice mitigation devices by providing an ice mitigation device that can prevent accumulation of ice near an oil skimmer and at the same time facilitate movement of surface oil toward the oil skimmer. Object management systems and methods disclosed herein are well suited for use in improving or enhancing the separation of immiscible fluids, including the removal of oil from icy water by an oil skimmer device or another related machine or apparatus. Object management systems may include curved vanes that are situated at the surface of the water which operate to increase the rate and/or amount of oil that is directed into an oil spill recovery device such as a skimmer. In some cases, one or more augers positioned at or near the circumference of an ice cage, which may be provided as a truncated cone or funnel shape, can operate to push/direct ice away from the object management system, thereby preventing the ice from blocking oil from entering the oil spill recovery device or skimmer. In some cases, an ice cage can include a include a mesh or other permeable structure, such as a wall or surface having a plurality of apertures. Embodiments of the present invention are well suited for use in separating immiscible liquids, for example to separate oil and water, and to operate on the waves in icy waters, remediating an oil spill.

Exemplary ice mitigation systems and methods disclosed herein are well suited for use in allowing or facilitating the passage of water and oil to a skimmer recovery mechanism. Exemplary ice mitigation systems and methods disclosed herein are particularly well suited for successfully operating in conditions where ice and oil are both responding to the suction of the skimmer. During operation, both ice and oil can be drawn toward the ice mitigation system. The ice mitigation systems can effectively repel or deflect ice, such that ice does not come into contact with a frame of the ice mitigation system, or so that minimal amounts of ice contact the frame and/or accumulate at the frame barrier. Hence, because there is little or no ice that comes into contact with the frame barrier, or that otherwise passes through the frame barrier to reach the skimmer device, the suction action of the skimmer device is not compromised by the presence of ice at the frame barrier and/or at the skimmer device itself. In this way, ice does not block access of oil at the skimmer head, and the skimmer device can effectively remove oil from the surface of the water and move the oil toward a recovery system. A physical (or mechanical) separation relies on taking advantage of different characteristics between the oil and ice that need to be separated. The ice mitigation systems disclosed herein are particularly effective at facilitating the separation of oil and water, despite the fact that the density of oil and the density of ice may be similar. The ice mitigation systems disclosed herein can be more effective than traditional methods of ice exclusion (such as dam intakes and cooling water intakes), because the ice mitigations systems facilitate the flow of oil to a skimmer device and at the same time exclude ice from reaching the skimmer device, whereas traditional methods may unnecessarily exclude the oil as well as the ice.

Ice management or mitigation systems and methods as disclosed herein are well suited for use with skimmer devices that are operated in broken ice fields. The ice management systems and method disclosed herein allow for or facilitate the separation of ice and oil on the surface of the water, take advantage of the different characteristics between the various materials involved, and are designed around the existence of the different properties of oil, water, and ice.

In this way, the ice management systems and methods disclosed herein can facilitate the operation and performance of one or more oil skimmers in broken ice conditions, for oil recovery in icy waters. The ice management systems and methods can prevent or mitigate the accumulation of ice on sections of a skimmer head, thus preserving a high level skimmer function, and preventing the operational failure of a skimmer device. Because broke ice does not accumulate adjacent to the skimmer device during operation, oil movement is not impeded and oil recovery can proceed efficiently and effectively. In some cases, the ice management systems and methods disclosed herein can be used in combination with multiple, commonly used skimmers. Exemplary ice management systems and methods employ an ice fence that surrounds an oil collection system such as a skimmer, prevent or inhibit the gathering or accumulation of ice still around the perimeter of an ice cage, and enhance the inflow of oil through the ice fence and the ice cage, to a skimmer contained within the ice cage, to facilitate oil recovery in ice environments.

The ice management systems and methods disclosed herein can use the fundamental differences between oil, water, and ice to repel floating broken ice across the water surface. The ice management systems and methods disclosed herein can be used with any of a variety of skimmer types that may be used by oil spill response teams in the event of an oil spill, including without limitation weir, drum, brush and rope mop skimmers. The ice management systems and methods disclosed herein can accommodate these multiple skimmers that are suitable for oil recovery in offshore arctic conditions.

Turning to the drawings, FIG. 1 depicts a perspective view of an ice management system 100 according to embodiments of the present invention. As shown here, ice management system includes an ice fence 200 having multiple vanes 210. In use, the vanes 210 operate at the level of the water surface, and help to protect against ice accretion while simultaneously allowing oil to be drawn to the center of the system 100 by either skimmer action or a separate current inducing system. In practice, many skimmer types draw oil independently because of their mechanical action. Grooved drum and brush skimmers operate on such principles. In exemplary embodiments, the vanes 210 are curved. In some cases, the vanes 210 can be curved like the propellers of a centrifugal pump. The presence of the vanes 210 can assist in accumulating oil around the perimeter and help the oil progress towards the center of an ice cage 300. In some cases, the vanes 210 operate to facilitate the entrainment of along the surface of the water, through the ice fence, and toward a central area of the ice cage.

As shown in FIG. 1, an ice management system 100 can also include a deflection assembly 400. In exemplary embodiments, a deflection assembly 400 can include multiple augurs 410. In use, the deflection system 400 can operate to slowly reorganize large pieces of ice that approach and/or gather adjacent to the ice fence 200. This reorganizing action can help to open or maintain channels within the water or fluid that surrounds the ice management system 100, and such channels can allow oil to pass to a skimmer system (not shown) that is disposed within a central area of the ice cage 300. In some embodiments, the deflection assembly 400 can operate based on the principle of an Archimedes auger.

Figure 2:
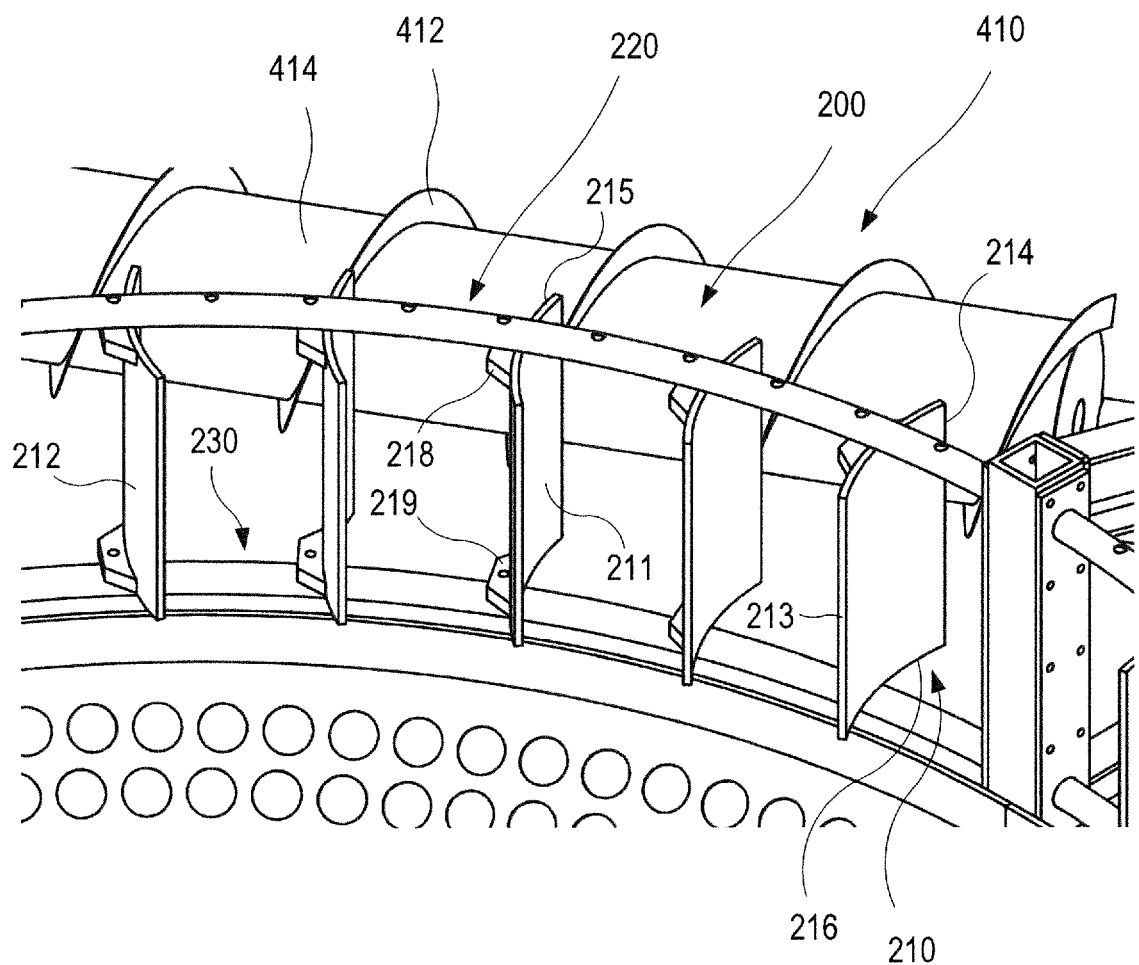
FIG. 2 provides a close-up perspective view of a portion of an ice management system according to certain embodiments of the invention.

FIG. 2 provides a close-up perspective view of a portion of an ice management system. As shown here, an ice fence 200 can include an upper rail 220, a lower rail 230, and one or more vanes 210 disposed between and coupled with the upper rail 220 and the lower rail. In some cases, the upper rail 220 is configured as a ring (e.g. an upper frame ring). In some cases, the lower rail 230 is configured as a ring (e.g. a lower frame ring). The spacing between adjacent vanes 210, the height of the vanes 210, the width of the vanes 210, the length of the vanes 210, and/or the curvature of the vanes 210 can be selected as desired. An auger 410 can include a spiral flight 412 coupled with a cylindrical drum 414.

In some embodiments, a vane 210 is provided as a curved rectangular plate having a front face 211, a rear face 212, an inner face 213, an outer face 214, an upper face 215, and a lower face 216. A vane 210 can also include or be coupled with an upper attachment mechanism 218 and a lower attachment mechanism 219. As shown here, an upper attachment mechanism can be coupled with the upper rail 220 and the lower attachment mechanism 219 can be coupled with the lower rail 230. The front face 211, rear face 212, upper face 215, and lower face 216 are curved, whereas the inner face 213 and outer face 214 are straight. The front face of one vane faces toward the rear face of an adjacent vane. In some cases, a vane may have a curved cuboid shape. In some cases, a vane may have a bent rectangular plate shape. In some cases, a vane may have a curved rectangular prism shape.

Figure 3A:
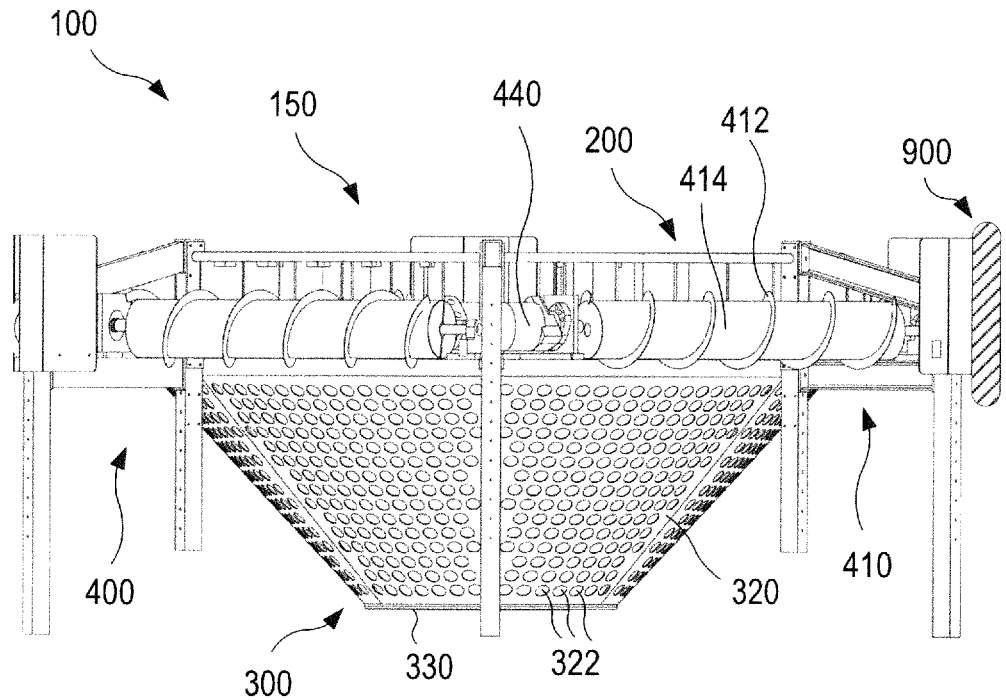
FIG. 3A depicts a side view of an ice management system according to certain embodiments of the invention.
Figure 3B:
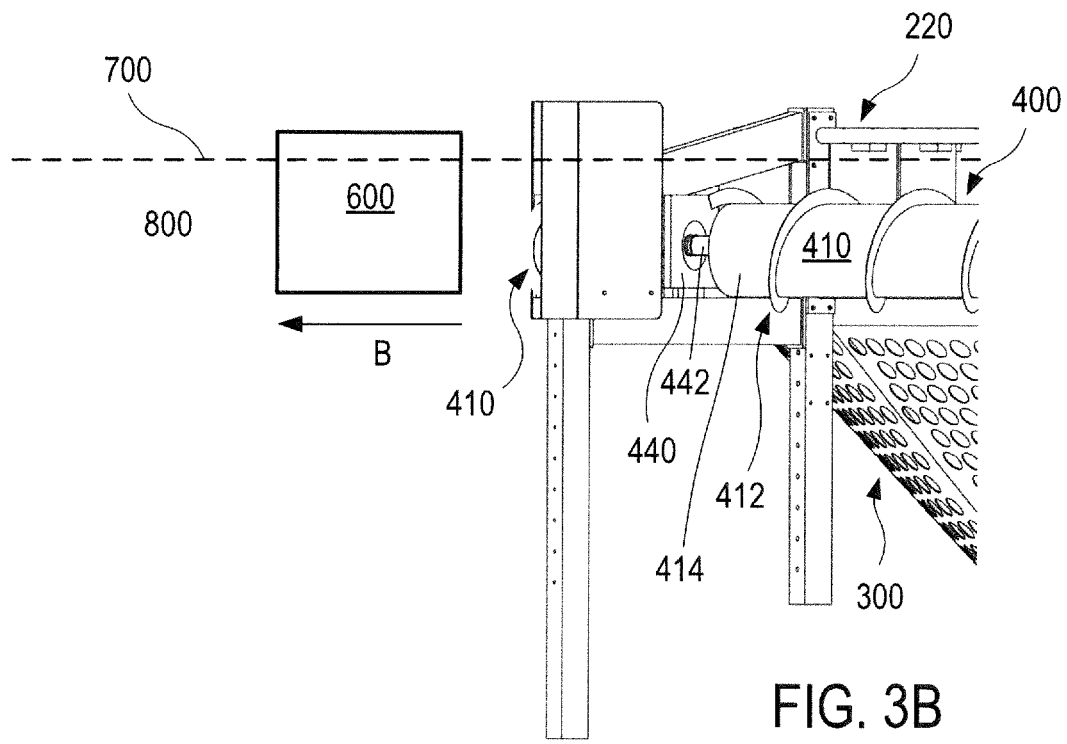
FIG. 3B depicts a close-up side view of a portion of an ice management system according to certain embodiments of the invention.

FIG. 3A depicts a side view of an ice management system 100, according to embodiments of the present invention. In use, the ice management system can operate to remove an amount of oil from a surface of a body of water. The ice management system 100 shown here includes an ice frame 150 having an ice fence 200 coupled with an ice cage 300. The system 100 may also include an oil skimmer device (not shown) disposed within the ice frame, and an ice deflection assembly 400 coupled with the ice frame 150. The ice deflection assembly 400 can include an auger 410 coupled with a motor 440. The auger 410 can include a drum 414 and a deflection mechanism such as a spiral flight 412 attached with the drum 414. The motor 440 can be configured to rotate the auger 410. The ice fence 200 includes a plurality of curved vanes, as discussed elsewhere herein. In this embodiment, the ice cage 300 is configured as an inverted truncated cone having an open base (near the ice fence 200), a lateral surface 320, and a flat tip 330 (away from the ice fence). The lateral surface 320 includes a plurality of lateral surface apertures 322. The flat tip includes a plurality of flat tip apertures (not shown). FIG. 3B depicts a close-up side view of a portion of an ice management system, according to embodiments of the present invention. An ice block 600 is shown floating at the surface 700 of a body of water 800 in which the ice management system is disposed. As shown here, operation of the ice deflection system 400 can cause the ice block 600 to move away from the deflection system 400 in a direction indicated by arrow B. This deflection of the ice block 600 can be caused by rotation of an auger 410 of the deflection assembly 400. In some cases, an ice management systems may include one or more hydraulic motors that generate rotational movement in the augurs. As shown here, an auger motor 440 is operative coupled with an auger 410, for generating such rotational movement. In some cases, an ice management system may include multiple auger motors, and each motor can individually operate to rotate a respective auger coupled thereto. In some cases, such independent operation of multiple auger motors can help to facilitate "crabbing" the ice cage 300 or rotating the cage 300 clockwise or counter-clockwise to open channels for oil to flow. Crabbing can involve starting and stopping rotation of one or more of the auger drums. Such selective rotational action of the auger drums can help to provide propulsion and/or rotation to the entire ice management system, as it floats in the water. In some cases, the auger drums can be rotated, for example at a slow rate of rotation, so as to push away or deflect the nearby ice blocks, while also not disturbing the surface of the water with turbulence. In some cases, an ice deflection auger 410 can utilize a hydraulic power pack currently used by deployable oil skimmers. Ice management system 100 may include or be coupled with one or more floatation devices 900, which in some cases may be buoys.

In some cases, an oil drawing current created by a skimmer that draws the ice and oil toward the center of the ice cage 300 would not create excessive amounts of force. In exemplary embodiments, an ice management system may include one or more buoys to keep the ice management system afloat. In some cases, one or more augers 410 can be manufactured so as to function as a buoy. For example, plastic or composite augers can also serve as buoys, to keep the entire ice management system afloat. Such embodiments can be useful for freeing up space within the ice cage 300 for additional oil pooling.

With continuing reference to FIG. 3B, it can be seen that an ice management system can take advantage of the freeboard or buoyancy of the ice block 600 with respect to the oil and/or water surface 700. Sea ice freeboard can refer to the difference between the height of the surface of sea ice and the surface of the water, and can relate to how much of an ice block is exposed in the air, above the surface of the water. For example, for a given ice block, 10% of the ice block may be disposed above the surface of the water. In some embodiments, the flights or fins 412 of the augers 410 will not breach the water surface 700 and 90% of the ice block 600 will be under the water surface 700. Hence, a significant portion or even the entirety of an auger 410 can be disposed beneath the water surface 700. In operation, the auger 410 does not accumulate ice upon itself. In some cases, the distance between the water level 700 and the top of the augur 410 (including the flight 412) is about 8 inches. In some cases, a central longitudinal axis of the drum 414 can be about 4 to 15 inches below the water level 700, depending on the buoyancy of the ice management system. In some cases, the distance from the upper frame ring or rail 220 to the water level 700 can be about 5 inches.

Embodiments of the present invention encompass any of a variety of configurations for an auger 410 and/or auger motor 440. For example, auger motor 440 can be configured to rotate an auger 410 at any desired rotational speed. Ice management systems may be equipped with augers having any desired length and/or circumferential size. Likewise, augers 410 can be provided in any desired placement configuration on the ice management system. In some cases, one or more auger motors 440 can also operate to generate rotational movement in the ice cage 300. In the embodiment depicted here, the upper frame rail 220 of the ice fence is positioned slightly above the water surface level 700. As discussed elsewhere herein, in some embodiments, tabs are used on the augers instead of the screw style flights 412 depicted here. In some cases, a gear reducer (e.g. a 90 degree gear reducer) can be included in an ice management system, between an auger motor 440 and an auger 410.

In some embodiments, the mounting of an auger motor can be configured to provide a large effective area of an ice deflection drum 414. In some cases, a drum 414 can be extended to encompass a portion of a drive shaft 442 of a motor 440. In some cases, motor placement can be configured so that a portion of the motor is set inside the drum 414 (e.g. roughly 2 inches inside of the drum 414). Such configurations can allow for a long drum length. In some cases, the drum length can be about 42 inches. In some cases, the drum has a length of about 36 inches. In some cases, the drum has a diameter of about 8 inches. In some cases, the motor 440 can be mounted so that it tilts at a 45° angle.

Figure 4:
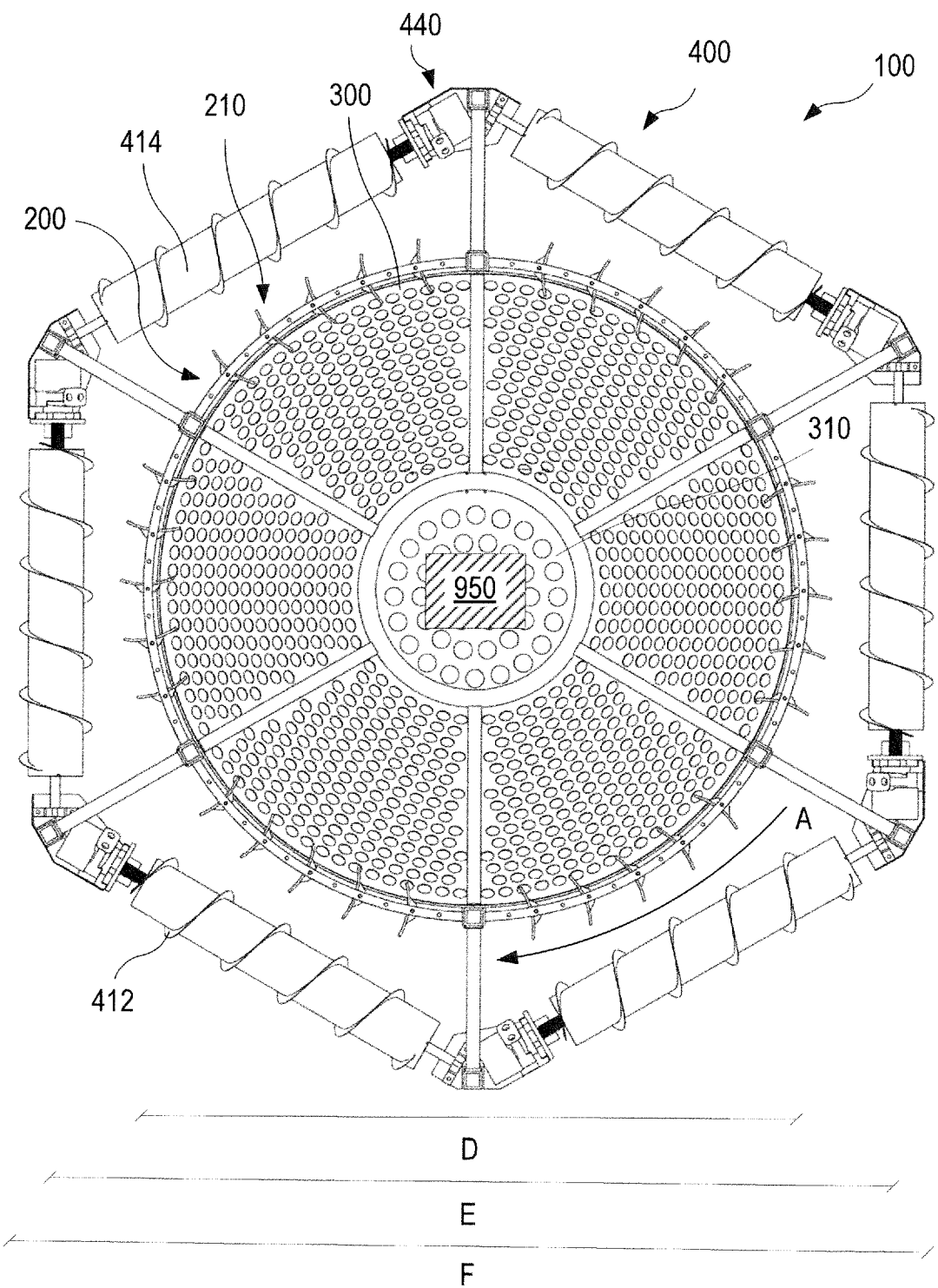
FIG. 4 shows a top view an ice management system according to certain embodiments of the present invention.

FIG. 4 shows an overhead or top view an ice management system 100 according to embodiments of the present invention. In some embodiments, an ice fence 200 of the system 100 is configured to rotate. For example, ice fence 200 can rotate in a clockwise direction as indicated by arrow A, which can cause the vanes 210 so scoop or divert oil in its path and push or direct the oil toward a central portion 310 of an ice cage 300 of the system 100. The curved nature of the perimeter vanes 210 can help to reject ice from entering the ice cage and to guide oil to the central portion 310 of the ice cage 300. In some embodiments, an ice management system can include a drive system that operates to generate rotational movement of the ice cage. As shown here, a skimmer device 950 can be disposed at a central portion 310 of the ice cage 300. In use, the skimmer device 950 floats in the water and operates to pull or draw oil from the surface of the water and to direct the recovered oil to a storage tank or recovery container (e.g. via recovery hoses, not shown). The fence 200 and deflection system 400 help to keep ice from reaching the skimmer device 950. In some cases, a skimmer device includes two rotating drums that operate to pick up oil off the surface of the water, and a scraper that operates to scrape the collected oil from the drums. A skimmer device can also include a trough that catches the scraped oil, and a pump that moves the oil from the trough through a hose and to a recovery container. The ice management system can be used with any desired type of skimmer device, and can help to keep flow channels or pathways in the water open, so as to allow oil from the surrounding areas to reach the skimmer device.

In some cases, a skimmer device 950 can operate to separate and aggregate oil from icy water. An ice cage 300 can be permeated with holes to allow oil and water to flow through walls or surface of the cage, to the center area within the boundary of the cage, and as oily water moves through the skimmer, oil is skimmed off of the top of the water and removed for disposal.

In some cases, ice fence 200 has a diameter D of about 72 inches. In some cases, a diameter E of a deflection assembly 400 (as defined by the centerlines of drums 414) can be about 90 inches. In some cases, a diameter F of a deflection assembly 400 (as defined by the outer edges of flights 412) can be about 110 inches. In the embodiment depicted here, ice management system 100 includes six motors 440. In some cases, an auger motor 440 can be driven by a hydraulic power pack. In some cases, an auger motor 440 can be approved for submerged saltwater operation. An auger motor 440 can operate to turn an auger drum 414 at a desired or target rpm (revolutions per minute). In some cases, the target drum speed can be a value within a range from about 3 rpm to about 5 rpm. Such low rpms can be effective in deflecting ice, while at the same time avoiding the creation of turbulence in the water. According to some embodiments, an ice management system has a particular flow rate (e.g. in gallons per minute, or gpm) that is related to the drum speed (e.g. in rpm). In some cases, the relationship between rpm and gpm is a linear relationship. In some cases, the relationship between rpm and gpm is linear within a range from about (y=1.5 rpm, x=0.15 gpm) to about (y=16.5 rpm, x=1.00 gpm). Such a relationship represents a linear operation at a low flow rate. In some cases, this relationship between rpm and gpm is a continuous relationship, and there is no jogging of the auger motor at such low rotational speeds and/or flow rates.

Figure 5:
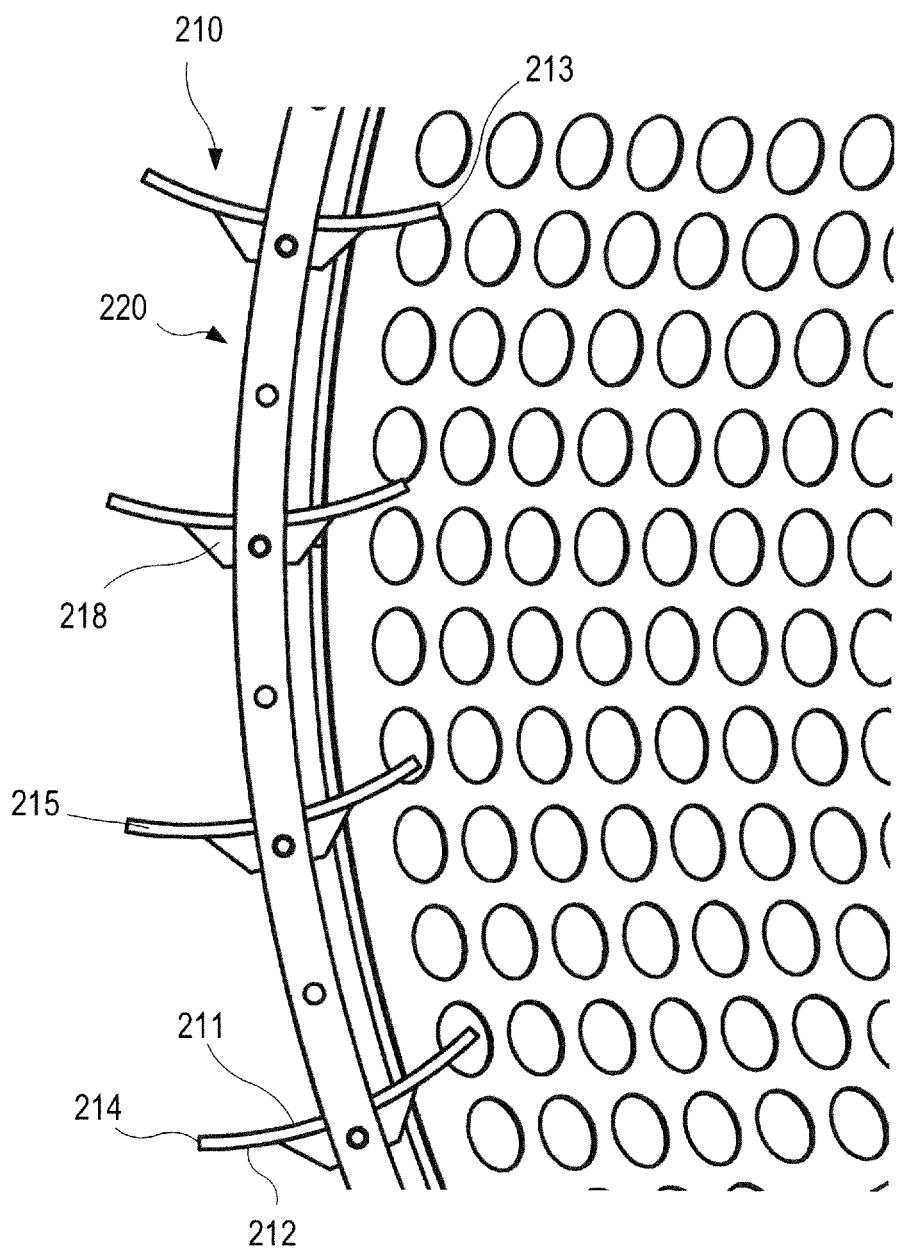
FIG. 5 provides a top view of a portion of an ice management system according to certain embodiments of the present invention.

FIG. 5 provides a top view of a portion of an ice management system. As shown here, an ice fence can include an upper rail 220 and one or more vanes 210 coupled with the upper rail 220. A vane 210 can be provided as a curved rectangular plate having a front face 211, a rear face 212, an inner face 213, an outer face 214, and an upper face 215. A vane 210 can also include or be coupled with an upper attachment mechanism 218. As shown here, an upper attachment mechanism 218 can be coupled with the upper rail 220. The front face of one vane faces toward the rear face of an adjacent vane. In some cases, a vane may have a curved cuboid shape. In some cases, a vane may have a bent rectangular plate shape. In some cases, a vane may have a curved rectangular prism shape.

Figure 6:
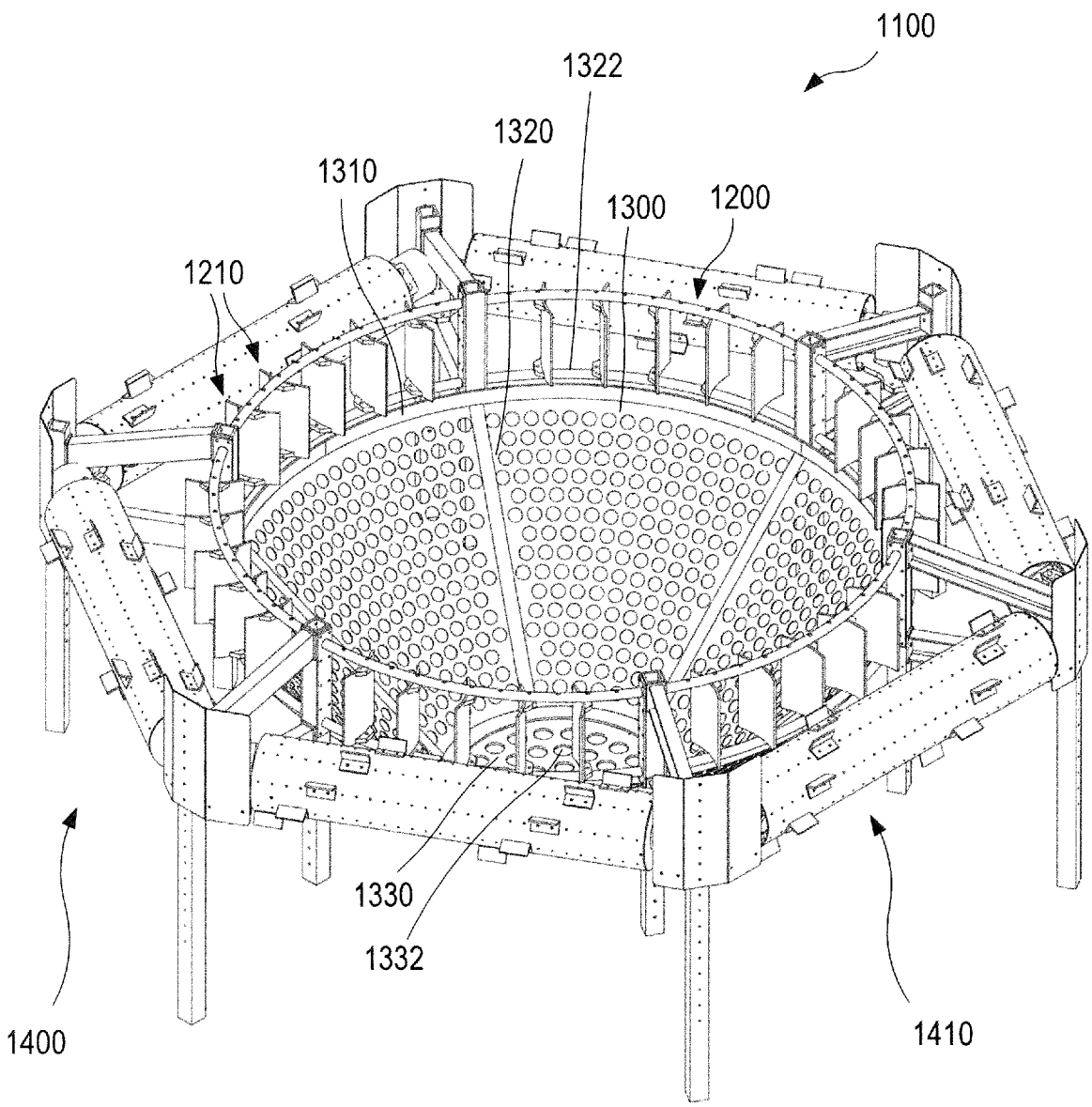
FIG. 6 depicts a perspective view of an ice management system according to certain embodiments of the present invention.

FIG. 6 depicts a perspective view of an ice management system 1100 according to embodiments of the present invention. As shown here, ice management system 1100 includes an ice fence 1200 having multiple vanes 1210. In use, the vanes 1210 operate at the level of the water surface, and help to protect against ice accretion while simultaneously allowing oil to be drawn to the center of the system 1100 by either skimmer action or a separate current inducing system. In practice, many skimmer types draw oil independently because of their mechanical action. Grooved drum and brush skimmers operate on such principles. In exemplary embodiments, the vanes 1210 are curved. In some cases, the vanes 1210 can be curved like the propellers of a centrifugal pump. The presence of the vanes 1210 can assist in accumulating oil around the perimeter and help the oil progress towards the center of an ice cage 1300. In some cases, the vanes 1210 operate to facilitate the entrainment of along the surface of the water, through the ice fence, and toward a central area of the ice cage. In this embodiment, the ice cage 1300 is configured as an inverted truncated cone having an open base 1310, a flat tip 1330, and a lateral surface 1320 disposed between the open base 1310 and the flat tip 1330. The lateral surface 1320 includes a plurality of lateral surface apertures 1322. The flat tip 1330 includes a plurality of flat tip apertures 1332.

As shown in FIG. 6, an ice management system 1100 can also include a deflection assembly 1400. In exemplary embodiments, a deflection assembly 1400 can include multiple augurs 1410. In use, the deflection system 1400 can operate to slowly reorganize large pieces of ice that approach and/or gather adjacent to the ice fence 1200. This reorganizing action can help to open or maintain channels within the water or fluid that surrounds the ice management system 1100, and such channels can allow oil to pass to a skimmer system (not shown) that is disposed within a central area of the ice cage 1300. In some embodiments, the deflection assembly 1400 can operate based on the principle of an Archimedes auger.

Figure 7:
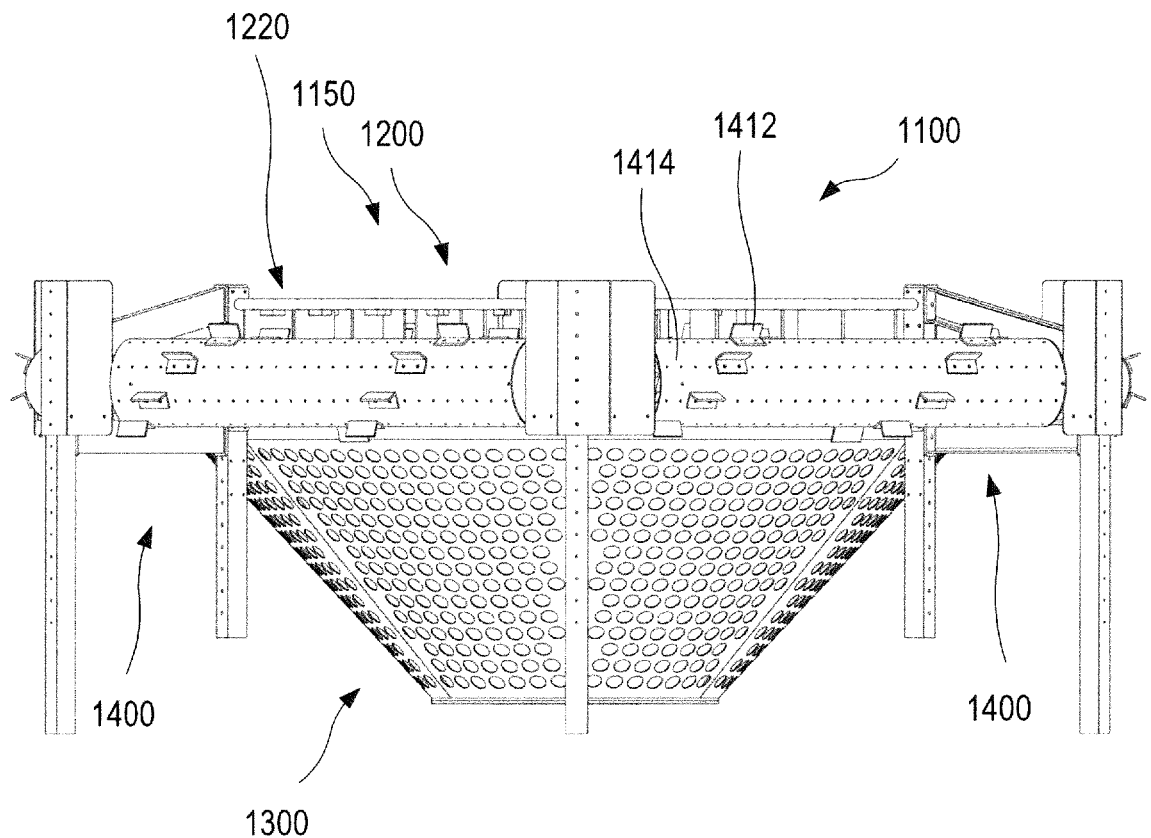
FIG. 7 depicts a side view of an ice management system according to certain embodiments of the invention.

FIG. 7 depicts a side view of an ice management system 1100, according to embodiments of the present invention. In use, the ice management system can operate to remove an amount of oil from a surface of a body of water. The ice management system 1100 shown here includes an ice frame 1150 having an ice fence 1200 coupled with an ice cage 1300. The system 1100 may also include an oil skimmer device (not shown) disposed within the ice frame, and an ice deflection assembly 1400 coupled with the ice frame 1150.

The ice deflection assembly 1400 can include an auger 1410 coupled with a motor (not shown). The auger 1410 can include a drum 1414 and a deflection mechanism such as a series of tabs 1412 arranged in a corkscrew pattern about the drum 1414. The motor can be configured to rotate the auger 1410. The ice fence 1200 includes a plurality of curved vanes, as discussed elsewhere herein.

As described elsewhere herein, operation of the ice deflection system 1400 can cause an ice block to move away from the deflection system 1400. Such deflection of the ice block can be caused by rotation of an auger 1410 of the deflection assembly 1400. In some cases, an ice management systems may include one or more hydraulic motors that generate rotational movement in the augurs. As shown here, an auger motor 1440 is operative coupled with an auger 1410, for generating such rotational movement. In some cases, an ice management system may include multiple auger motors, and each motor can individually operate to rotate a respective auger coupled thereto. In some cases, such independent operation of multiple auger motors can help to facilitate "crabbing" the ice cage 1300 or rotating the cage 1300 clockwise or counter-clockwise to open channels for oil to flow. Crabbing can involve starting and stopping rotation of one or more of the auger drums. Such selective rotational action of the auger drums can help to provide propulsion and/or rotation to the entire ice management system, as it floats in the water. In some cases, the auger drums can be rotated, for example at a slow rate of rotation, so as to push away or deflect the nearby ice blocks, while also not disturbing the surface of the water with turbulence. In some cases, an ice deflection auger 1410 can utilize a hydraulic power pack currently used by deployable oil skimmers. Ice management system 1100 may include or be coupled with one or more floatation devices, which in some cases may be buoys, as discussed elsewhere herein.

In some cases, an oil drawing current created by a skimmer that draws the ice and oil toward the center of the ice cage 1300 would not create excessive amounts of force. In exemplary embodiments, an ice management system may include one or more buoys to keep the ice management system afloat. In some cases, one or more augers 1410 can be manufactured so as to function as a buoy. For example, plastic or composite augers can also serve as buoys, to keep the entire ice management system afloat. Such embodiments can be useful for freeing up space within the ice cage 1300 for additional oil pooling.

As discussed elsewhere herein, an ice management system can take advantage of the freeboard or buoyancy of the ice block with respect to the oil and/or water surface. Sea ice freeboard can refer to the difference between the height of the surface of sea ice and the surface of the water, and can relate to how much of an ice block is exposed in the air, above the surface of the water. For example, for a given ice block, 10% of the ice block may be disposed above the surface of the water. In some embodiments, the tabs 1412 of the augers 1410 will not breach the water surface and 90% of the ice block will be under the water surface. Hence, a significant portion or even the entirety of an auger 1410 can be disposed beneath the water surface. In operation, the auger 1410 does not accumulate ice upon itself. In some cases, the distance between the water level and the top of the augur 1410 (including the tabs 1412) is about 8 inches. In some cases, a central longitudinal axis of the drum 1414 can be about 4 to 15 inches below the water level, depending on the buoyancy of the ice management system. In some cases, the distance from the upper frame ring or rail 1220 to the water level can be about 5 inches.

Embodiments of the present invention encompass any of a variety of configurations for an auger 1410 and/or an auger motor. For example, an auger motor can be configured to rotate an auger 1410 at any desired rotational speed. Ice management systems may be equipped with augers having any desired length and/or circumferential size. Likewise, augers 1410 can be provided in any desired placement configuration on the ice management system. In some cases, one or more auger motors can also operate to generate rotational movement in the ice cage 1300.

Figure 8:
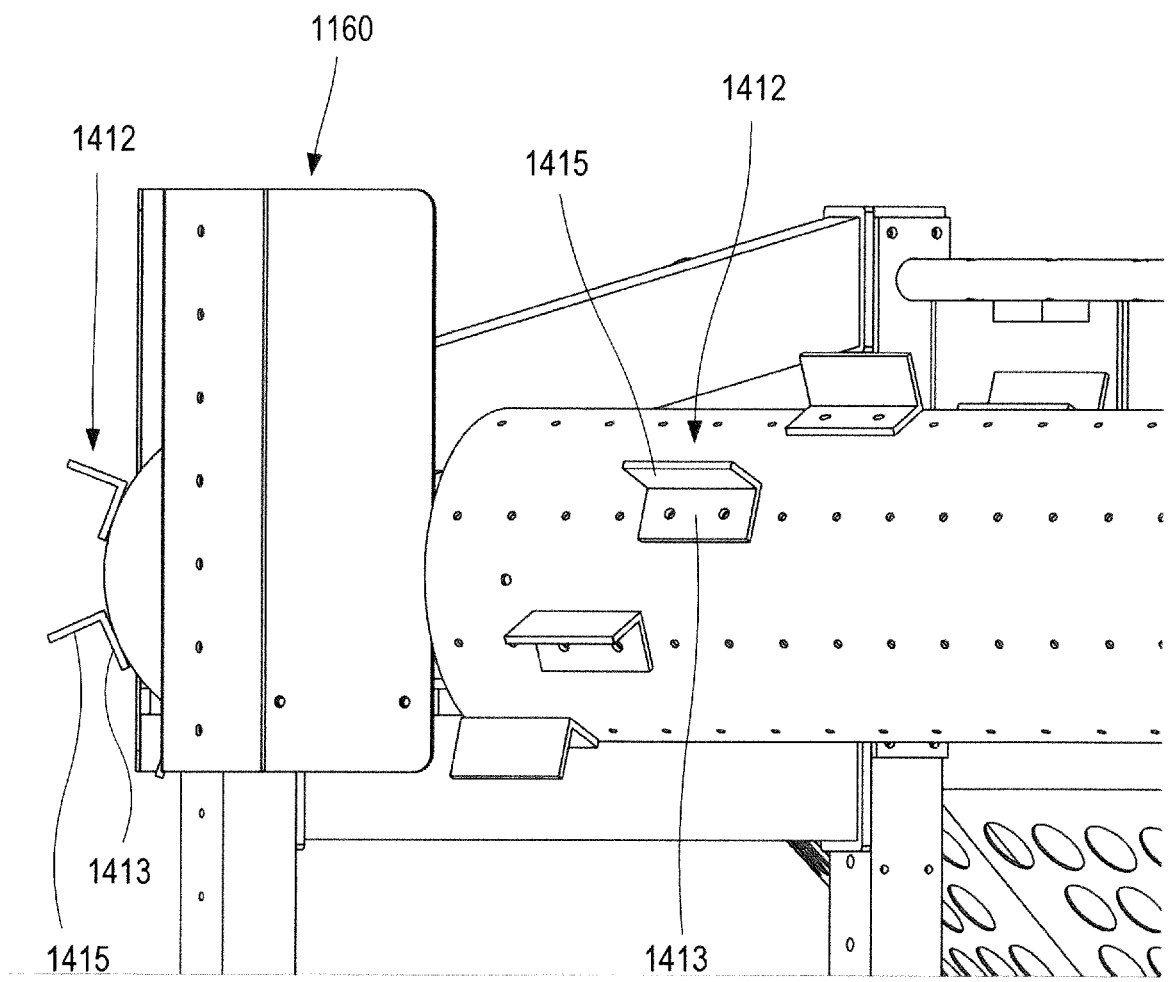
FIG. 8 depicts a close-up side view of a portion of an ice management system according to certain embodiments of the invention.

FIG. 8 depicts a close-up side view of a portion of an ice management system, according to embodiments of the present invention. As shown here, a tab 1412 can include a first portion 1413 that lies generally flush, apposed, or tangential with a surface of an auger drum 1414, and a second portion 1415 that is perpendicular to the first portion 1413 and that extends in a radial fashion from a central longitudinal axis of the auger drum 1414. A drum 1414 can include multiple holes 1417 which can be used to mount the tabs 1412 to the drum 1414. The holes 1417 can be arranged in a polka-dot pattern. In some cases, spikes can be used in addition or in place of the tabs 1412. In some cases, an ice frame may include a cover 1160 that operates to shield an auger motor. Where an ice management system includes multiple auger motors, the ice frame may include multiple covers to shield the respective auger motors.

As will be appreciated by one of ordinary skill in the art, the present invention may be embodied as an apparatus (including, for example, a system, a machine, a device, and/or the like), as a method (including, for example, a business process, and/or the like), or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An ice management system for removing an amount of oil from a surface of a body of water, the system comprising:
    an ice frame having an ice fence coupled with an ice cage;
    an oil skimmer device disposed within the ice frame; and
    an ice deflection assembly coupled with the ice frame,
    wherein the ice deflection assembly includes an auger coupled with a motor, wherein the auger includes a drum and a deflection mechanism, and wherein the motor is configured to rotate the auger,
    wherein the auger is a first auger, and wherein the ice deflection system further comprises a second auger coupled with a second motor, a third auger coupled with a third motor, an fourth auger coupled with a fourth motor, a fifth auger coupled with a fifth motor, and a sixth auger coupled with a sixth motor, wherein the first auger, the second auger, the third auger, the fourth auger, the fifth auger, and the sixth auger are arranged in a hexagon pattern disposed around a perimeter of the ice fence.

2. The ice management system of claim 1, wherein the ice fence comprises an upper frame ring, a lower frame ring, and a plurality of curved vanes, and wherein each curved vane extends between and is coupled with the upper frame ring and the lower frame ring.

3. The ice management system of claim 1, wherein the auger is a buoyant auger.

4. The ice management system of claim 1, wherein the deflection mechanism of the auger comprises a spiral flight.

5. The ice management system of claim 1, wherein the deflection mechanism of the auger comprises a tab.

6. The ice management system of claim 1, wherein the deflection mechanism of the auger comprises a plurality of tabs arranged in a corkscrew pattern.

7. The ice management system of claim 1, wherein the motor is configured to rotate the auger at a rotational speed having a value within a range from about 3 revolutions per minute to about 5 revolutions per minute.

8. The ice management system of claim 1, wherein the auger is positioned to be submerged when the ice management system is floating in the body of water.

* * * * *